(12) United States Patent
Ganschow et al.

(10) Patent No.: US 7,404,854 B2
(45) Date of Patent: Jul. 29, 2008

(54) METHOD FOR PIGMENTING SEMI-CRYSTALLINE PLASTICS WITH PHTHALOCYANINE PIGMENTS IN A NON-WARPING MANNER

(75) Inventors: Matthias Ganschow, Wiesbaden (DE); Carsten Plueg, Seeheim-Jugenheim/Ober-Beerbach (DE); Hans Joachim Metz, Darmstadt (DE)

(73) Assignee: Clariant Produkte (Deutschland) GmbH, Frankfurt (DE)

( * ) Notice: Subject to any disclaimer, the term of this patent is extended or adjusted under 35 U.S.C. 154(b) by 206 days.

(21) Appl. No.: 10/569,112

(22) PCT Filed: Aug. 7, 2004

(86) PCT No.: PCT/EP2004/008881

§ 371 (c)(1),
(2), (4) Date: Feb. 21, 2006

(87) PCT Pub. No.: WO03/066742

PCT Pub. Date: Aug. 14, 2003

(65) Prior Publication Data

US 2006/0207477 A1  Sep. 21, 2006

(30) Foreign Application Priority Data

Aug. 21, 2003  (DE) ............................... 103 38 730

(51) Int. Cl.
- C09B 67/16 (2006.01)
- C09B 67/20 (2006.01)
- C08K 5/00 (2006.01)
- C08K 9/04 (2006.01)
- C09D 17/00 (2006.01)
- C09D 11/00 (2006.01)
- G03G 9/09 (2006.01)

(52) U.S. Cl. ............... 106/412; 106/410; 106/411; 106/413; 524/88; 540/122; 540/136

(58) Field of Classification Search ............ 106/31.78, 106/410, 411, 412, 413; 524/88; 540/136, 540/122

See application file for complete search history.

(56) References Cited

U.S. PATENT DOCUMENTS

| 4,020,088 | A | * | 4/1977 | Wessling | 540/137 |
| 4,051,146 | A | * | 9/1977 | Wessling | 540/137 |
| 4,107,133 | A | | 8/1978 | Sawai et al. | |
| 4,233,206 | A | | 11/1980 | Katsura et al. | |
| 4,889,562 | A | | 12/1989 | Bugnon et al. | |
| 5,271,759 | A | | 12/1993 | Wooden et al. | |
| 5,274,010 | A | | 12/1993 | Bugnon et al. | |
| 5,401,780 | A | | 3/1995 | Bugnon et al. | |
| 5,472,495 | A | | 12/1995 | Schroeder | |
| 5,882,360 | A | | 3/1999 | Bauer et al. | |
| 6,180,694 | B1 | | 1/2001 | Bugnon et al. | |
| 6,288,142 | B1 | | 9/2001 | Bugnon et al. | |
| 6,794,504 | B2 | | 9/2004 | Klopp et al. | |
| 2003/0088091 | A1 | | 5/2003 | Klopp et al. | |
| 2006/0052490 | A1 | | 3/2006 | Weber et al. | |
| 2006/0155014 | A1 | * | 7/2006 | Metz et al. | 524/88 |

FOREIGN PATENT DOCUMENTS

| DE | 2933896 A1 | * | 3/1981 |
| DE | 4214868 | | 11/1992 |
| DE | 4313090 | | 10/1994 |
| DE | 10204275 | | 8/2003 |
| EP | 0296107 | | 12/1988 |
| EP | 0466646 | | 1/1992 |
| EP | 0498667 | | 8/1992 |
| JP | 53-120739 A | * | 10/1978 |
| WO | WO 01/77231 | | 10/2001 |
| WO | WO03/066742 | | 8/2003 |

OTHER PUBLICATIONS

Translation of Japanese Patent Specification No. JP 53-120739 A (Oct. 21, 1978).*
PCT International Search Report for PCT/EP2004/00881, mailed Nov. 15, 2004.
U.S. Appl. No. 10/502,840, filed Jul. 28, 2004, by Metz et al.
English Translation of International Preliminary Report on Patentability for PCT/EP2004/008881, mailed Jul. 20, 2006.
Co-pending U.S. Appl. No. 11/792,774, by Ganschow et al., filed Jun. 8, 2007.

* cited by examiner

*Primary Examiner*—Anthony J Green
(74) *Attorney, Agent, or Firm*—Anthony A. Bisulca

(57) ABSTRACT

A process for warpage-free pigmentation of a plastic pigmented by a phthalocyanine pigment which was heated to not less than 80° C. as a suspension in a organic solvent in the presence of a carboxylic acid containing 2, 3 or 4 carboxyl groups or a salt of such a carboxylic acid.

16 Claims, No Drawings

METHOD FOR PIGMENTING SEMI-CRYSTALLINE PLASTICS WITH PHTHALOCYANINE PIGMENTS IN A NON-WARPING MANNER

The present invention relates to phthalocyanine pigments for coloration of macromolecular organic material, especially for warpage-free pigmentation of partly crystalline plastics, especially polyolefins.

The coloration of partly crystalline plastics with organic pigments frequently gives rise to warpage or distortion phenomena. The pigmentation of large-volume injection moldings, especially those composed of polyethylene, leads to deformation, shrinkage and cracking (internal stresses), rendering the colored articles unusable, depending on the field of application. Bottle crates, for example, are likely to become unstackable by loss of shape.

These disadvantages relate to the majority of organic pigments, whereas inorganic pigments and a minority of organic pigments behave neutrally. It is believed that pigments act as nucleation sites during the solidification of the polymer melt and thus lead to a polymer which is prone to warp/distort.

Various methods have already been proposed to counteract the warpage problem. Warpage-free pigments are obtained according to U.S. Pat. No. 4,107,133 by treatment of copper phthalocyanines with a silane or titanate coupler, according to U.S. Pat. No. 4,233,206 through organic pigments (especially copper phthalocyanines) which contain methylol groups esterified with carboxylic acids, according to EP 0 466 646 through pigments coated with polar polymers, according to EP 0 498 667 through use of polyalkyleneoxy-substituted dyes, according to EP 0 296 107 through ethylcellulose-coated pigments, according to DE 43 13 090 through organic pigments which have been exposed to a low temperature plasma, according to DE 42 14 868 through sulfonic acid and alkali metal sulfonate group modified pigments and according to WO 01/77231 through incipiently chlorinated copper phthalocyanines having a chlorine content of 10-40% by weight and a dispersion harshness $\leq 10$.

DE-A-102 04 275 states that phthalocyanines can be converted into warpage-free phthalocyanines by treatment with strong bases, for example sodium ethoxide, and alcohols in organic media.

However, these methods do not always meet the current requirements in the art and do not lead to the desired result, depending on the pigment used. In addition, most of these methods are inconvenient and they even require the synthesis of pigment derivatives.

It has now been found that phthalocyanines, especially copper phthalocyanines, can be converted by treatment with dicarboxylic acids in organic media into warpage-free phthalocyanines of high color strength which are surprisingly useful for warpage-free pigmentation of partly crystalline plastics.

The present invention accordingly provides a process for warpage-free pigmentation of partly crystalline plastics, characterized in that it utilizes a phthalocyanine pigment which was heated to not less than 80° C. as a suspension in a preferably acid group free organic solvent in the presence of a carboxylic acid containing 2, 3 or 4 carboxyl groups or a salt of such a carboxylic acid.

As used herein, the term "warpage-free" is to be understood as meaning a degree of warpage which is distinctly reduced compared with the untreated pigment.

The process of the present invention is preferably employed in the case of phthalocyanines having Fe, Ni, Co or Cu as central atom or in the case of metal-free phthalocyanines having a halogen content of 0% to 50% by weight. Halogen is to be understood as meaning chlorine and/or bromine, especially chlorine. Particular preference is given to chlorine-containing copper phthalocyanines, especially those having a chlorine content of 1% to 50% by weight and most preferably having a chlorine content of 2% to 10% by weight, corresponding to about 0.5 to 2 chlorine atoms per molecule, for example in the case of C.I. Pigment Blue 15 (chlorine-free), 15:1, 15:2, 15:3, 15:4, 15:6, 16, 75 and also C.I. Pigment Green 7 and 36.

The organic solvent employed is an acid group free, especially carboxylic acid and phenol free, polar organic solvent, preferably aliphatic acid amides, such as N,N-dimethylformamide; cyclic carboxamides, such as N-methylpyrrolidone, alcohols having 1 to 20 carbon atoms, more preferably $C_2$-$C_6$-alcohols, cyclohexanol, especially n-, iso- or tert-butanol; glycols, ethers and glycol ethers, such as tetrahydrofuran, ethylene glycol, propylene glycol, ethyldiglycol, methoxypropanol, methoxybutanol, ethylene glycol monoalkyl ethers or dialkyl ethers, wherein alkyl is selected from methyl, ethyl, propyl and butyl; polyethylene glycol monomethyl ethers, especially those having an average molar mass of 350 to 550 g/mol, and polyethylene glycol dimethyl ethers, especially those having an average molar mass of 250 to 500 g/mol; aromatic hydrocarbons, such as toluene, xylenes or ethylbenzene; aromatic halohydrocarbons, such as chlorobenzene, dichlorobenzenes or bromobenzene; nitrobenzene; sulfones and sulfoxides, such as dimethyl sulfoxide or sulfolane; and also mixtures thereof.

The amount of organic solvent employed per g of phthalocyanine pigment is generally in the range from 1 to 30 g and preferably in the range from 5 to 15 g. It will be appreciated that large amounts of organic solvent can be used as well, but this would be uneconomical. If smaller amounts of organic solvent were used, the reaction mixture might be difficult to stir.

The copper phthalocyanine used in the process of the present invention can be a crude pigment, a ground prepigment (activated by dry grinding) or a ground and finished pigment (ready-produced pigment). The copper phthalocyanine used in the process of the present invention is advantageously used as a dried material having a water content of not more than 2% by weight. A higher water content should be avoided, since the warpage values of the pigments produced according to the present invention would increase. The organic solvent preferably has a water content of not more than 1% by weight, and preferably the water content is in the range from 0.03% to 0.2% by weight.

Aliphatic di-, tri- and tetracarboxylic acids are preferred as carboxylic acids. Preferred dicarboxylic acids are saturated or unsaturated $C_2$-$C_{20}$-dicarboxylic acids, in particular $C_2$-$C_4$-dicarboxylic acids, examples being oxalic acid, malonic acid, succinic acid, maleic acid and fumaric acid. However, the alkali metal or alkaline earth metal salts of said dicarboxylic acids are particularly preferred. Disodium oxalate and dipotassium oxalate are particularly preferred. Especially citric acid and aconitic acid are useful as tricarboxylic acids. Especially butanetetracarboxylic acid is useful as tetracarboxylic acid. The alkali metal and alkaline earth metal salts of these acids are preferred in this case too. The amount of carboxylic acid (salt) used, based on the pigment, is advantageously in the range from 5 to 300 mol % and preferably in the range from 5 to 100 mol %. The carboxylic acids or carboxylic acid salts should likewise be used in an as water-free form as possible (water content not more than 1% by weight).

It is advantageous in many cases for the suspension to further comprise a base. Useful bases include for example:

alkali metal hydroxides, alkaline earth metal hydroxides, alkali metal alkoxides and alkaline earth metal alkoxides, the alkoxide having 1 to 20 carbon atoms and preferably 2 to 4 carbon atoms. Particular preference is given to sodium hydroxide, potassium hydroxide, sodium ethoxide and potassium ethoxide.

The amount of base used is advantageously in the range from 0 to 200 mol %, preferably in the range from 1 to 100 mol % and especially in the range from 5 to 80 mol %, based on the pigment. The use of larger amounts of base is possible, but uneconomical.

The present invention's treatment of the phthalocyanine can be carried out in an open or closed system at not less than 80° C., preferably at 120 to 220° C. and especially at 160 to 200° C., in which case the operation in a closed system will usually be carried out under the autogenous pressure. If desired, a higher pressure can be employed in an autoclave. The thermal treatment generally takes from 1 to 24 h and preferably from 1 to 8 h.

The treated pigment will advantageously be isolated as follows:

The reaction mixture is cooled, preferably to about 30 to 90° C., the suspension is stirred into water and the pigment is isolated, preferably in the neutral to acidic pH range. Then the suspension may be neutralized with an acid, for example HCl, and the pigment separated off by filtration. The pigment is washed, dried and ground. It will be appreciated that the pigment may also be filtered off directly after cooling and then be washed with plenty of water, dried and ground. No further finish is required.

The phthalocyanine pigments of the present invention are notable for higher color strengths and better warpage properties than phthalocyanine pigments produced according to the prior art, and therefore are per se novel.

The phthalocyanines produced according to the present invention are very useful for coloration of partly crystalline plastics.

Partly crystalline plastics is to be understood as referring to those which solidify to form small crystalline nuclei or aggregates, including those which do so only in the presence of nucleating agents (organic pigments for example). Partly crystalline plastics are generally thermoplastic macromolecular organic materials having a molecular weight ($M_w$) of $10^4$ to $10^8$, preferably $10^5$ to $10^7$, and a crystallinity ($X_c$) of 10 to 99.9%, preferably of 40 to 99% and more preferably of 80 to 99%. Preferred partly crystalline plastics are homopolymers, block or random copolymers and terpolymers of ethylene, propylene, butylene, styrene and/or divinylbenzene, especially polyolefins, such as polyethylene (HDPE, MDPE, LDPE), polypropylene, especially high density polyethylene (HDPE), also polystyrene, PVC, polyesters, such as polyethylene terephthalate, and polyamides, such as nylon 6 and nylon 66.

The partly crystalline plastics may further comprise additives in customary amounts, examples being stabilizers, optical brighteners, fillers and lubricants. When used for coloration of partly crystalline plastics, the phthalocyanine pigment treated according to the present invention will advantageously be used in an amount of 0.01% to 5% by weight and preferably 0.05% to 1% by weight, based on the plastic. The coloration step can be carried out according to customary methods, as by extrusion for example.

The influence on the warpage propensity of polyolefin by the pigment produced according to the present invention is tested on a ready-produced injection molding in the form of a plaque on the lines of the European Standard EN ISO 294-4: 2003 (Injection moulding of test specimens of thermoplastic materials, Part 4:

Determination of moulding shrinkage). After aging, the dimensions of the plaque (length, width) are measured and the degree of warpage is determined according to the following equation:

$$\% \text{ warpage} = (\% \text{ warpage vertical} - \% \text{ warpage horizontal})/(\% \text{ warpage horizontal}) \times 100\%$$

The warpage values are determined at 220° C. and at 280° C. Pigments where warpage is below 10% have proved warpage-free in commercial practice. Pigments where warpage is in the range from 10% to 20% are known as low warpers and need to pass a preliminary test to be used for warpage-free coloration of plastics.

The phthalocyanine pigments produced according to the present invention can of course also be used for pigmenting any desired macromolecular material of natural or synthetic origin, for example for masterbatches, inks, including printing inks, including inkjet inks, coatings, including powder coatings, paints, electrophotographic toners and color filters.

In the examples which follow, percentages are by weight and the reported mol % ages are based on the pigment used, unless otherwise stated.

EXAMPLE 1

A mixture of 15 g of crude copper phthalocyanine pigment (P.B. 15:1, chlorine content about 3%) having a water content ≦0.6%, 250 ml of N-methylpyrrolidone, 1.26 g of oxalic acid (56 mol %) and 0.4 g of sodium hydroxide (40 mol %) is heated to 180° C. for 2 hours. After the suspension has been cooled down, the mixture is stirred into water and subsequently neutralized with hydrochloric acid. The reaction mixture is filtered off with suction, washed with water and ground.

EXAMPLE 2

Example 1 is repeated except that 0.63 g of oxalic acid (28 mol %) and 0.6 g of sodium hydroxide (60 mol %) are used.

EXAMPLE 3

A mixture of 15 g of crude copper phthalocyanine pigment (P.B. 15:1, chlorine content about 3%) having a water content ≦0.6%, 250 ml of N-methylpyrrolidone, 2.01 g of disodium oxalate (60 mol %) is heated to 180° C. in a sealed vessel for 2 h. Cooling is followed by a workup as under Example 1.

EXAMPLE 4

Example 3 is repeated except that 2.01 g of disodium oxalate (60 mol %) and 0.4 g of sodium hydroxide (40 mol %) are used.

EXAMPLE 5

Example 3 is repeated except that 2.35 g of disodium oxalate (70 mol %) and 1.02 g of sodium ethoxide (60 mol %) are used.

EXAMPLE 6

A mixture of 15 g of crude copper phthalocyanine pigment (P.B. 15:1, Cl content about 3% by weight) having a water content≦0.6%, 250 ml of methyltriglycol, 2.01 g of disodium oxalate (60 mol %) and 0.4 g of sodium hydroxide (40 mol %) is heated to 160° C. in a sealed vessel for 2 h. Cooling is followed by a workup as under Example 1.

EXAMPLE 7

A mixture of 15 g of ready-produced copper phthalocyanine pigment (PV-Echtgrun GG; P.G. 7, Cl content 49% by weight) having a water content≦0.6%, 250 ml of N-methylpyrrolidone, 2.01 g of disodium oxalate and 0.4 g of sodium hydroxide is heated to 180° C. for 2 h. Cooling is followed by workup as under Example 1.

EXAMPLE 8

A mixture of 15 g of crude copper phthalocyanine pigment (P.B. 15:1, chlorine content about 3%) having a water content≦0.6%, 250 ml of N-methylpyrrolidone, 1.34 g of citric acid (27 mol %) and 0.6 g of sodium hydroxide (60 mol %) is heated to 180° C. in a sealed vessel for 2 h. Cooling is followed by workup as under Example 1.

EXAMPLE 9

A mixture of 15 g of crude copper phthalocyanine pigment (P.B. 15:1, chlorine content about 3%) having a water content≦0.6%, 250 ml of N-methylpyrrolidone, 1.16 g of phthalic acid (27 mol %) and 0.6 g of sodium hydroxide (60 mol %) is heated to 180° C. in a sealed vessel for 2 h. Cooling is followed by workup as under Example 1.

The pigments of Examples 1 to 9 are used to pigment polyethylene plaques (600 g of ®Novolen and 0.6 g of pigment) and warpage is determined.

Method: Shrinkage testing of organic pigments in injection-molded polyethylene. A rectangular plaque is molded with film gate and the dimensions 60 by 60 mm. Evaluation is by measurement along and across the direction of molding. For each pigment tested 10 moldings were produced and measured out, the respective average value being employed. The control used is 10 moldings from nonpigmented plastic. It is very important in this connection that this material experiences exactly the same processing history as the pigmented system.

| Example | 220° C. warpage [%] | 280° C. warpage [%] |
| --- | --- | --- |
| untreated P.B. 15:1 | 82 | 87 |
| 1 | 47 | 46 |
| 2 | 9 | 9 |
| 3 | 12 | 10 |
| 4 | 9 | 8 |
| 5 | 4 | 15 |
| 6 | 20 | 24 |
| untreated P.G. 7 | 63 | 19 |
| 7 | 24 | 5 |
| 8 | 9 | 11 |
| 9 | 6 | 2 |

The polyethylene plaques pigmented according to the present invention have high color strengths and a distinctly lower warpage value than untreated P.B. 15:1 or
P.G.7.

We claim:

1. A process for warpage-free pigmentation of a partly crystalline plastic comprising the step of pigmenting the partly crystalline plastic with a phthalocyanine pigment which was heated to not less than 80° C. as a suspension in an organic solvent in the presence of a carboxylic acid containing 2, 3 or 4 carboxyl groups or a salt of the carboxylic acid containing 2, 3 or 4 carboxyl groups, and wherein the organic solvent is selected from the group consisting of aliphatic acid amides, cyclic carboxamides, alcohols having 1 to 20 carbon atoms, glycols, ethers, glycol ethers, aromatic hydrocarbons, aromatic halohydrocarbons, nitrobenzene, sulfoxides, sulfones and mixtures thereof.

2. A process according to claim 1, wherein the phthalocyanine pigment is a copper phthalocyanine pigment.

3. A process according to claim 1, wherein the organic solvent has a water content of not more than 1% by weight.

4. A process according to claim 1, wherein the carboxylic acid is a saturated or unsaturated dicarboxylic acid having 2 to 20 carbon atoms.

5. A process according to claim 1, wherein the carboxylic acid is oxalic acid, malonic acid, succinic acid, maleic acid, fumaric acid, citric acid or a mixture thereof.

6. A process according to claim 1, wherein the carboxylic acid or the carboxylic acid salt is present in an amount of 5 to 300 mol%, based on the phthalocyanine pigment.

7. A process according to claim 1, wherein the suspension further comprises a base.

8. A process according to claim 1, wherein the phthalocyanine pigment is heated to a temperature of 120 to 220° C.

9. A process according to claim 1, wherein the phthalocyanine pigment is heated for 1 to 24 hours.

10. A process according to claim 1, wherein the partly crystalline plastic is a polyolefin.

11. A process according to claim 1, wherein the partly crystalline plastic is a polyethylene or polypropylene.

12. A process according to claim 2, wherein the copper phthalocyanine pigment is a chlorinated copper phthalocyanine pigment.

13. A process according to claim 7, wherein the base is selected from the group consisting of an alkali metal hydroxide, alkaline earth metal hydroxide, alkali metal alkoxide and alkaline earth metal alkoxide having 1 to 20 carbon atoms.

14. A process according to claim 10, wherein the polyolefin is polyethylene or polypropylene.

15. A process for warpage-free pigmentation of a partly crystalline plastic comprising the step of pigmenting the partly crystalline plastic with a phthalocyanine pigment which was heated to not less than 80° C. as a suspension in an organic solvent in the presence of a carboxylic acid containing 2, 3 or 4 carboxyl groups or a salt of the carboxylic acid containing 2, 3 or 4 carboxyl groups, wherein the carboxylic acid is in the form of an alkali metal salt or an alkaline earth metal salt.

16. A process for preparing a phthalocyanine pigment, comprising the step of heating the phthalocyanine pigment to a temperature of not less than 80° C. as a suspension in an organic solvent in the presence of a carboxylic acid containing 2, 3 or 4 carboxyl groups or a salt of the carboxylic acid containing 2, 3 or 4 carboxyl groups, and wherein the organic solvent is selected from the group consisting of aliphatic acid amides, cyclic carboxamides, alcohols having 1 to 20 carbon atoms, glycols, ethers, glycol ethers, aromatic hydrocarbons, aromatic halohydrocarbons, nitrobenzene, sulfoxides, sulfones and mixtures thereof.

* * * * *